United States Patent
Bachelder et al.

(10) Patent No.: US 9,656,613 B2
(45) Date of Patent: May 23, 2017

(54) LOW PROFILE PUSH ON METAL DOGHOUSE

(71) Applicants: Magna International Inc., Aurora (CA); GM GLOBAL TECHNOLOGY OPERATIONS LLC, Detriot, MI (US)

(72) Inventors: Theodore J. Bachelder, Vanderbilt, MI (US); Adam M. Lyon, Mancelona, MI (US); Ronald J. Andor, East Jordan, MI (US); Michael S. Gignilliat, Traverse City, MI (US); Matthew C. Patterson, Warren, MI (US); James R. Roll, Ann Arbor, MI (US)

(73) Assignees: MAGNA INTERNATIONAL INC., Aurora (CA); GM GLOBAL TECHNOLOGY OPERATIONS LLC, Detroit, MI (US)

( * ) Notice: Subject to any disclaimer, the term of this patent is extended or adjusted under 35 U.S.C. 154(b) by 283 days.

(21) Appl. No.: 13/852,353

(22) Filed: Mar. 28, 2013

(65) Prior Publication Data

US 2013/0255065 A1     Oct. 3, 2013

Related U.S. Application Data

(60) Provisional application No. 61/617,457, filed on Mar. 29, 2012.

(51) Int. Cl.
*F16B 5/06* (2006.01)
*B60R 13/02* (2006.01)
(Continued)

(52) U.S. Cl.
CPC ........ *B60R 13/0206* (2013.01); *F16B 5/0657* (2013.01); *F16B 21/09* (2013.01);
(Continued)

(58) Field of Classification Search
CPC ...... F16B 5/0657; F16B 5/065; F16B 21/083; F16B 39/24; F16B 37/02; F16B 21/09;
(Continued)

(56) References Cited

U.S. PATENT DOCUMENTS

2013/0081255 A1*  4/2013  Bachelder ............... F16B 39/24
29/525.02

FOREIGN PATENT DOCUMENTS

| DE | 102005038782 A1 * | 2/2007 |
| EP | 1439313 A2 * | 7/2004 |
| WO | WO 2009123616 A1 * | 10/2009 |

\* cited by examiner

*Primary Examiner* — Jack W Lavinder
(74) *Attorney, Agent, or Firm* — Warn Partners, P.C.

(57) ABSTRACT

A push on doghouse retainer arrangement used for providing a connection between the B-pillar of an automobile, and an appliqué having a high-gloss surface, or "show surface." The a push on doghouse includes a formed low profile spring steel base and a slightly raised low profile doghouse portion, which includes a slot for receiving a base of a clip portion. The base also includes at least one attachment aperture. The attachment aperture includes an effective amount of serrations for holding of the doghouse onto a low profile rib molded into the part. The present invention simplifies mold design, minimizes potential for a read condition, and provides a robust engagement for a winged clip type fastener in limited space.

12 Claims, 3 Drawing Sheets

(51) Int. Cl.
*F16B 21/09* (2006.01)
*F16B 21/20* (2006.01)

(52) U.S. Cl.
CPC ............. *B60R 13/025* (2013.01); *F16B 5/065* (2013.01); *F16B 21/20* (2013.01); *Y10T 24/304* (2015.01); *Y10T 29/49947* (2015.01)

(58) Field of Classification Search
CPC . F16B 21/20; B60R 13/0206; B60R 13/0243; Y10T 24/30; Y10T 24/309; Y10T 24/344; Y10T 24/307; Y10T 29/49948; B60J 5/0468
See application file for complete search history.

LOW PROFILE PUSH ON METAL DOGHOUSE

CROSS-REFERENCE TO RELATED APPLICATIONS

This application claims the benefit of U.S. Provisional Application No. 61/617,457, filed Mar. 29, 2012.

FIELD OF THE INVENTION

The present invention relates to a method for providing a secure connection between a first attachable part such as an appliqué and the pillar or other component part of an automobile.

BACKGROUND OF THE INVENTION

The components of an automobile are connected together in many different ways. One type of connection uses a fastener, such as a bolt or screw.

The packaging space in vehicles is often very limited due to the number of components used to assemble the vehicle, the size of the vehicle, and the like. Some of the area between components, such as a B-pillar and an appliqué, is very limited. This requires some of the fastener designs to be very small. Typically, one type of connector used for retaining two components is a molded "doghouse." A doghouse is a molded-in feature used to attach a secondary clip. Alternatively, the doghouse is used for driving a threaded screw.

Molded-in features, such as a doghouse, often cause a "read" condition on the show surface of a part resulting from differences in cooling temperatures, caused by differences in mass/volume of the resin between the feature and the substrate. A read condition is a deformation or imperfection in a surface. The limited space also causes a tooling condition that is very fragile due to the reduced size. A feature of the type described above has a minimum workable size which does not facilitate the doghouse having suitable strength. The size of the part and the proximity of adjacent features limit the packaging space and travel of movable feature (lifters) in the mold.

Other designs include a separately molded doghouse which is attached with an adhesive backing applied to the part. These designs also lack suitable strength and do no meet space limitations in current low profile designs. Certain design requirements also include a push on wing type clip. This presents further space constraints which are unaddressed by current designs.

Accordingly, there exists a need for a retainer which provides a suitable connection between an appliqué and a pillar, such as an A-pillar, B-pillar, or C-pillar of an automobile.

SUMMARY OF THE INVENTION

The present invention is directed to a method of attachment between two components. More specifically, the present invention is a retainer used for providing a connection between the B-pillar of an automobile, and an appliqué having a high-gloss surface, or "show surface." In one embodiment, there is provided a push on doghouse which includes a formed low profile spring steel base. The base includes a slightly raised low profile doghouse portion which includes a slot for receiving a base of a clip portion. The base also includes at least one attachment aperture. The attachment aperture includes an effective amount of serrations for holding of the doghouse onto a low profile rib molded into the part.

The present invention simplifies mold design, minimizes potential for a read condition, and provides a robust engagement for a winged clip type fastener in limited space.

It is an object of the invention to provide for attachment of the exterior ornamentation of an appliqué in a limited packaging space that is robust without introducing a read condition or breakage. It is another object of the invention to provide an attachment which is toolable in an injection molded part and which will meet a minimum pull off force without breakage while applied to the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
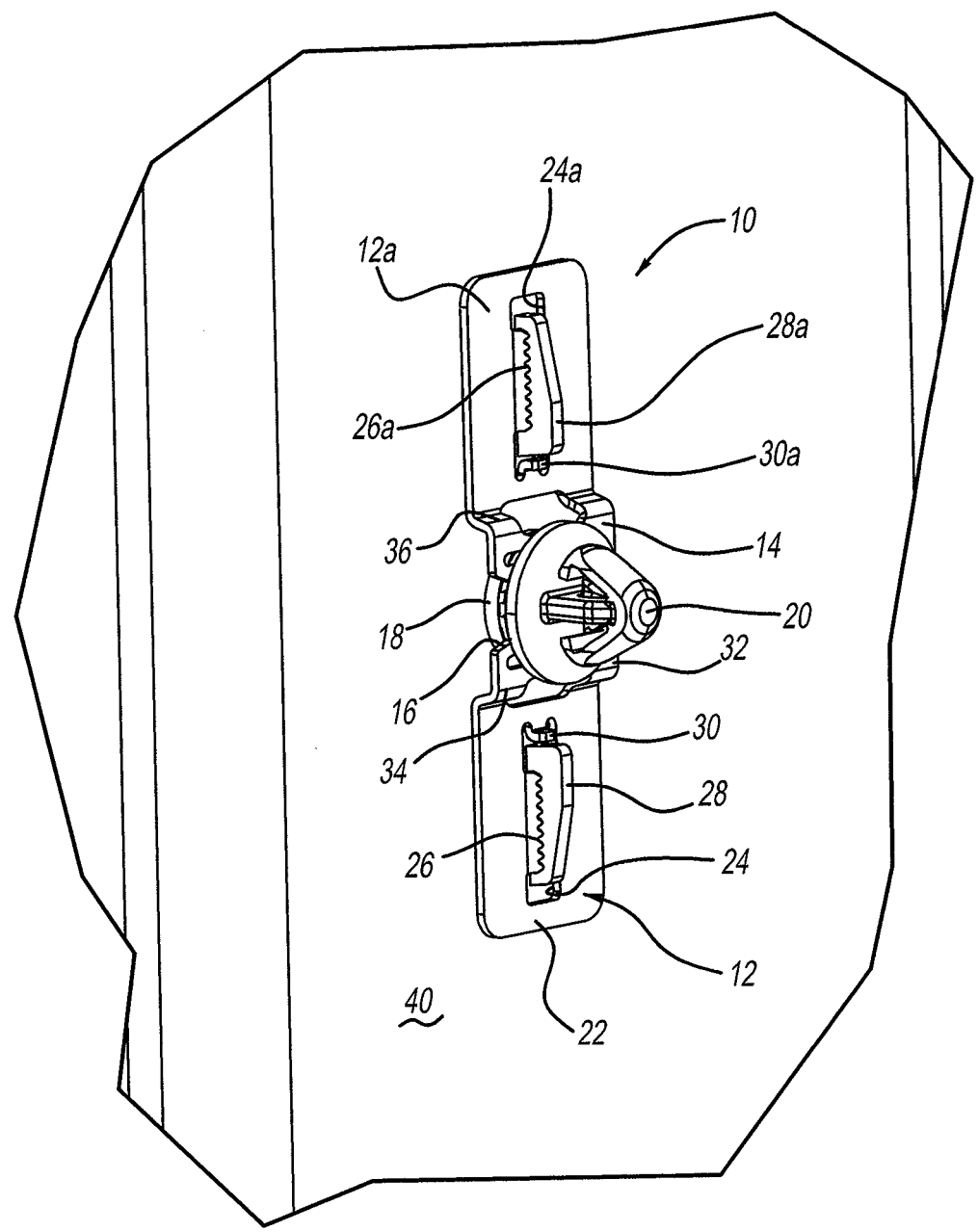
FIG. 1 is a perspective view of a retainer attached to a door appliqué, according to the present invention.
Figure 2:
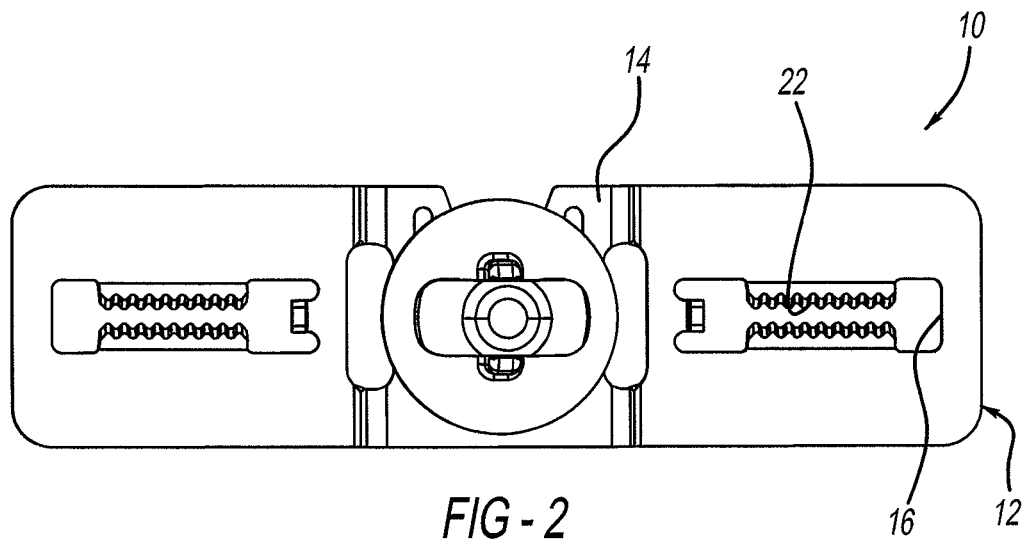
FIG. 2 is a bottom view of a retainer, according to the present invention.

The following description of the preferred embodiment(s) is merely exemplary in nature and is in no way intended to limit the invention, its application, or uses.

Referring now to FIGS. 1-6 there is provided a push on doghouse generally shown at 10 which is made from a metal material, preferably spring steel. Spring steel is defined as a steel that is processed in a manner to give it elastic properties and returns it to its original shape after removal of a load force. The composition of spring steel is generally defined to be low alloy, medium carbon (e.g. 0.30%-0.59% carbon content by weight of the steel) or high carbon content (e.g., 0.60%-0.99% carbon content by weight of the steel). Spring steel used in accordance with the present invention also has a high yield strength of generally 150-1650 MPa, ideally 250-690 MPa or preferably 250-520 MPa.

The doghouse 10 includes a formed low profile spring steel base generally indicated at 12. The base 12 includes a slightly raised low profile doghouse portion 14 which includes a slot 16 for receiving a base 18 of a clip portion 20. The base 12 includes at least one attachment portion 22 which includes an attachment aperture 24. The attachment aperture 24 includes an effective amount of serrations 26 for holding of the doghouse 10 onto a low profile rib 28 molded into the part such as an appliqué which is attached. Preferably, serrations are configured in both sides of the slot. A positioning tab 30 is provided for assuring that the doghouse is properly positioned on the part with respect to the rib 28.

The low profile doghouse portion 14 includes a central clip attachment portion 32 which is separated from the base 12 by a pair of walls 34 and 36. Walls 34 and 36 are configured to provide a height h, shown in FIG. 3 and defined by the distance between the surface of the base 12 furthest from the low profile doghouse portion 14 and a first surface of the low profile doghouse portion 14 closest to the base 12. The height h of the doghouse just high enough such that the base 18 of the clip 20 can be housed underneath inside of the doghouse. Preferably, the walls are substantially vertical although they can be configured at an angle as long as a predetermined height of the doghouse is maintained. The clip 20 also includes a middle portion 19 spaced apart from and creating a gap 17 between the base 18 and middle portion 19, so that the central clip attachment portion 32 slides into the gap by a keyhole attachment in the slot 16 of the doghouse raised portion 14. The presence of the middle portion 19 helps the clips 20 frictionally engage the central clip attachment portion 32 by creating a gap. It is the scope of this invention for the middle portion 19 to not be present.

As will be readily appreciated by the drawings, in a preferred embodiment, a corresponding base 12a, slot 24a, serrations 26a and tab 30 push on to engage a second rib 28a.

Figure 3:
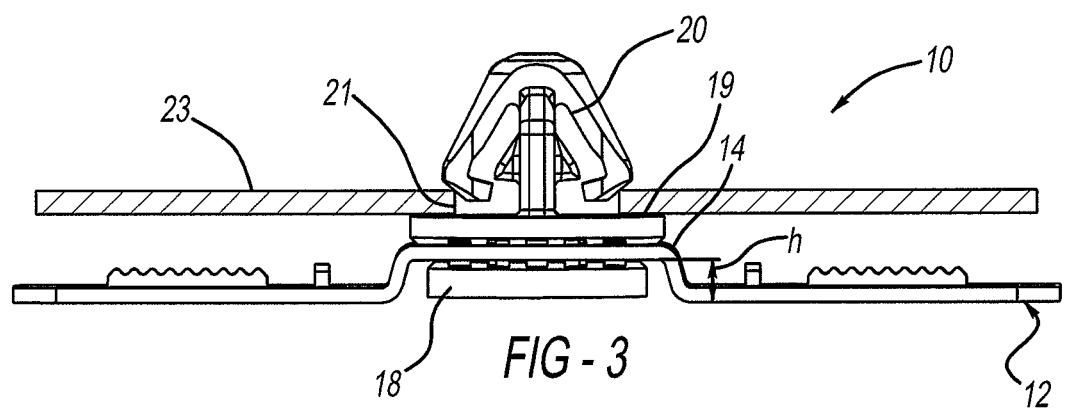
FIG. 3 is a cross-sectional side view of a retainer connected to a vehicle aperture, according to the present invention.
Figure 4:
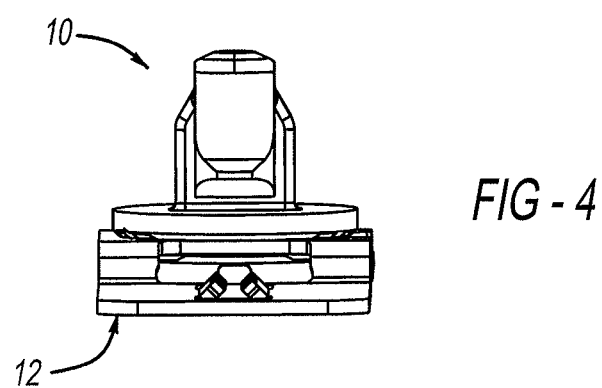
FIG. 4 is an end view of a retainer, according to the present invention.

Once the retainer doghouse 10 and clip 20 has been attached to a part or appliqué 40, the part may be attached to a B-pillar of a vehicle by press fitting the clip 20 into an aperture 21 in a vehicle 23 (shown in FIG. 3)

One of the advantages of the present invention is that the ribs 28,28a that are integrally formed with the appliqué 40 use a minimal amount of material. This greatly reduces or eliminates the amount of read condition on the outer surface of the appliqué 40, where it is necessary to have a high-gloss, esthetically pleasing appearance.

Figure 5:
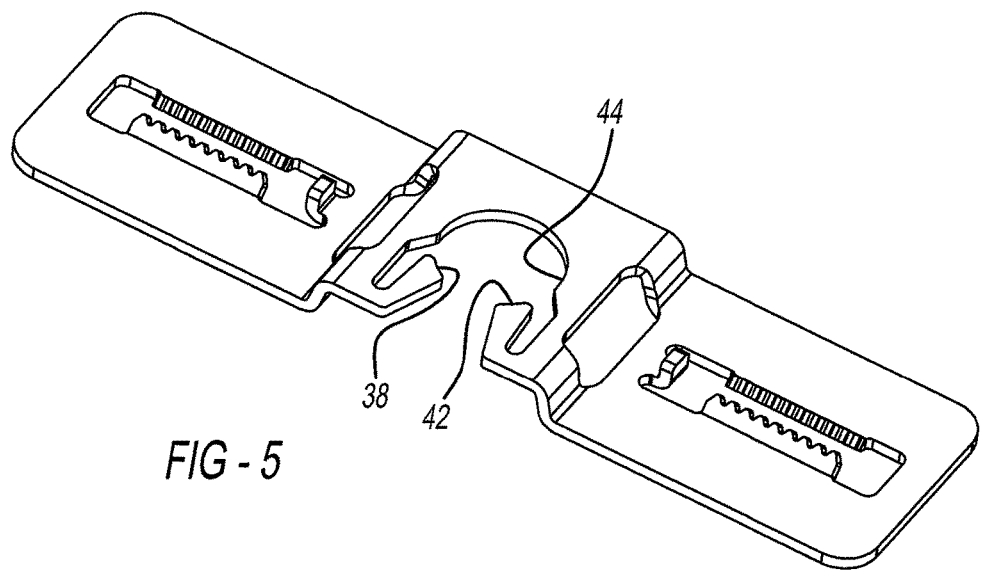
FIG. 5 is a perspective view of the retainer without the clip attached in accordance with the present invention.
Figure 6:
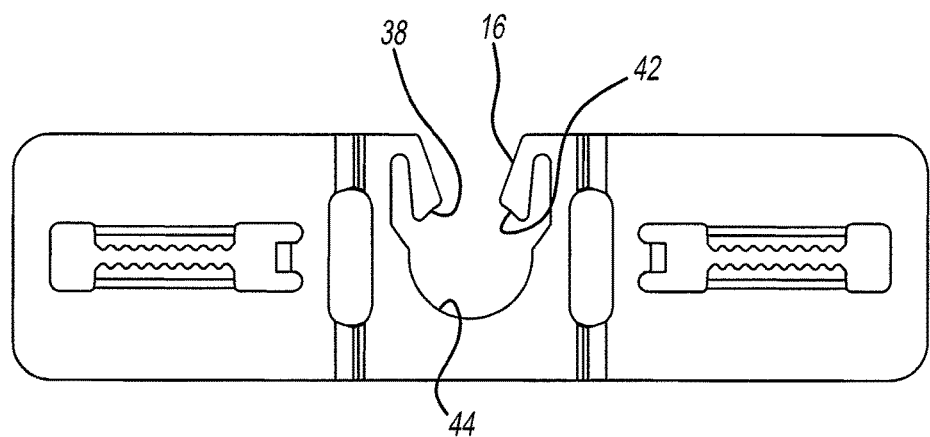
FIG. 6 is a top view of the retainer of FIG. 5.

Referring now to FIGS. 5 and 6 the slot 16 for retaining the clip 20 is shown in more detail. The slot includes deflectable fingers 38 and 42. These fingers are used when pushing the reduced diameter of the clip 20 into the slot. The fingers are deflectable outwardly for allowing the base of the clip to be inserted. Thereafter, the base is retained in the slot by the fingers 38 and 42. The rounded aperture 44 is designed to be larger than the reduced diameter portion of the clip such that positioning movement of the clip is facilitated such that variances in tolerances in the parts to be assembled may be accommodated. The rounded aperture 44 is smaller in diameter than the base 18 and middle portion 19 of the clip 20 so that the clip 20 does not slide through the rounded aperture when the reduced diameter portion of the clip 20 is connected to the slot.

The inline design of the apertures 24 and 24a are designed to provide an engineered tensile failure mode which allows for permanent attachment to the vehicle yet provides serviceability of the part if necessary. The use of the keyhole arrangement and clip allows for a floating clip such that clip position may vary if tolerances in the parts to be attached are not exact.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A push on doghouse retainer arrangement comprising:
a clip having a base;
a spring steel base including a raised low profile doghouse portion separated from the spring steel base by a pair of walls configured to provide a height defined by the distance between a surface of the spring steel base furthest from the low profile doghouse portion and a first surface of the low profile doghouse portion closest to the spring steel base, said doghouse portion has a slot for receiving said clip;
a plurality of low profile ribs formed on a molded part;
a plurality of attachment apertures arranged in an in line design on said spring steel base for receiving said at least one low profile rib, wherein said in line design provides an engineered tensile failure mode; and
a positioning tab extending into each of the plurality of attachment apertures for assuring proper positioning of the at least one low profile rib in a respective one of the plurality of attachment apertures.

2. The push on doghouse retainer arrangement of claim 1, wherein said at least one attachment aperture includes serrations for gripping onto and holding said low profile rib in said at least one attachment aperture.

3. The push on doghouse retainer arrangement of claim 1 wherein said slot further includes deflectable fingers grasp and retain said clip.

4. The push on doghouse retainer arrangement of claim 3 further comprising a reduced diameter portion of said clip that is received in said slot and a rounded aperture of said slot that is larger than said reduced diameter portion of said clip and smaller than a base of said clip, wherein the deflectable fingers are deflectable outwardly for allowing the reduced diameter portion of the clip to be inserted in the base and retained by the flexible fingers.

5. The push on doghouse retainer arrangement of claim 4, further comprising a middle portion of said clip spaced apart from said base and creating a gap between said middle portion of said clip and said base of said clip, wherein said middle portion of said clip is larger in diameter than said rounded aperture of said slot.

6. The push on doghouse retainer arrangement of claim 1 further comprising an aperture formed on a vehicle for receiving said clip and connecting said molded part to the vehicle using said doghouse retainer arrangement.

7. A push on doghouse retainer arrangement comprising:
a clip having a base and a reduced diameter portion;
a spring steel base including a raised low profile doghouse portion separated from the spring steel base by a pair of walls configured to provide a height defined by the distance between a surface of the spring steel base furthest from the low profile doghouse portion and a first surface of the low profile doghouse portion closest to the spring steel base, said doghouse portion has a slot for receiving said reduced diameter portion of said clip;
a plurality of low profile ribs formed on a molded part;
two attachment portions of said base, each one of said two attachment portions having an attachment aperture for receiving and holding one of said two low profile ribs, wherein each said attachment aperture of said two attachment portions are arranged in an in line design on said spring steel base to provide an engineered tensile failure mode; and
a positioning tab extending into each attachment aperture for assuring proper positioning of the one of the two low profile ribs in the respective attachment aperture.

8. The push on doghouse retainer arrangement of claim 7 wherein each attachment aperture includes serrations for gripping onto and holding said one of said two low profile ribs.

9. The push on doghouse retainer arrangement of claim 7 wherein said slot further includes deflectable fingers grasp and retain said clip.

10. The push on doghouse retainer arrangement of claim 9, wherein said reduced diameter portion of said clip is received in said slot and a rounded aperture of said slot is larger than said reduced diameter portion of said clip and smaller than a base of said clip, wherein the deflectable fingers are deflectable outwardly for allowing the reduced diameter portion of the clip to be inserted in the base and retained by the flexible fingers.

11. The push on doghouse retainer arrangement of claim 10, further comprising a middle portion of said clip spaced apart from said base and creating a gap between said middle portion of said clip and said base of said clip, wherein said middle portion of said clip is larger in diameter than said rounded aperture of said slot.

12. The push on doghouse retainer arrangement of 7 further comprising an aperture formed on a vehicle for receiving said clip and connecting said molded part to the vehicle using said doghouse retainer arrangement.

* * * * *